July 23, 1929.  A. L. THURSTON ET AL  1,721,935
AIRCRAFT
Filed June 13, 1923   3 Sheets-Sheet 3

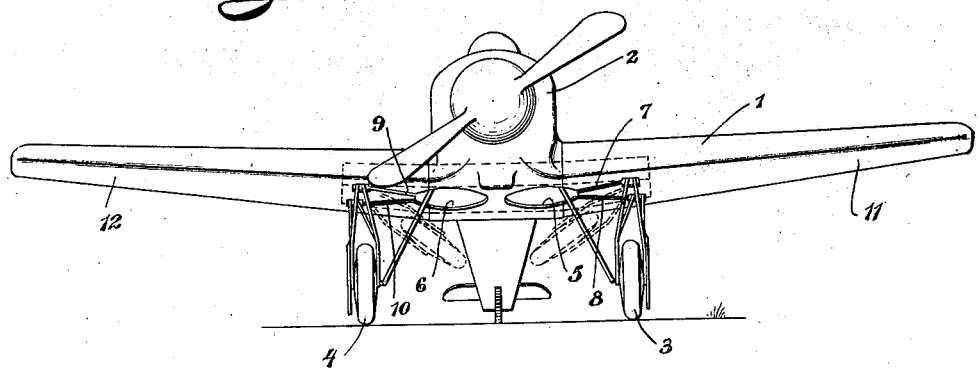
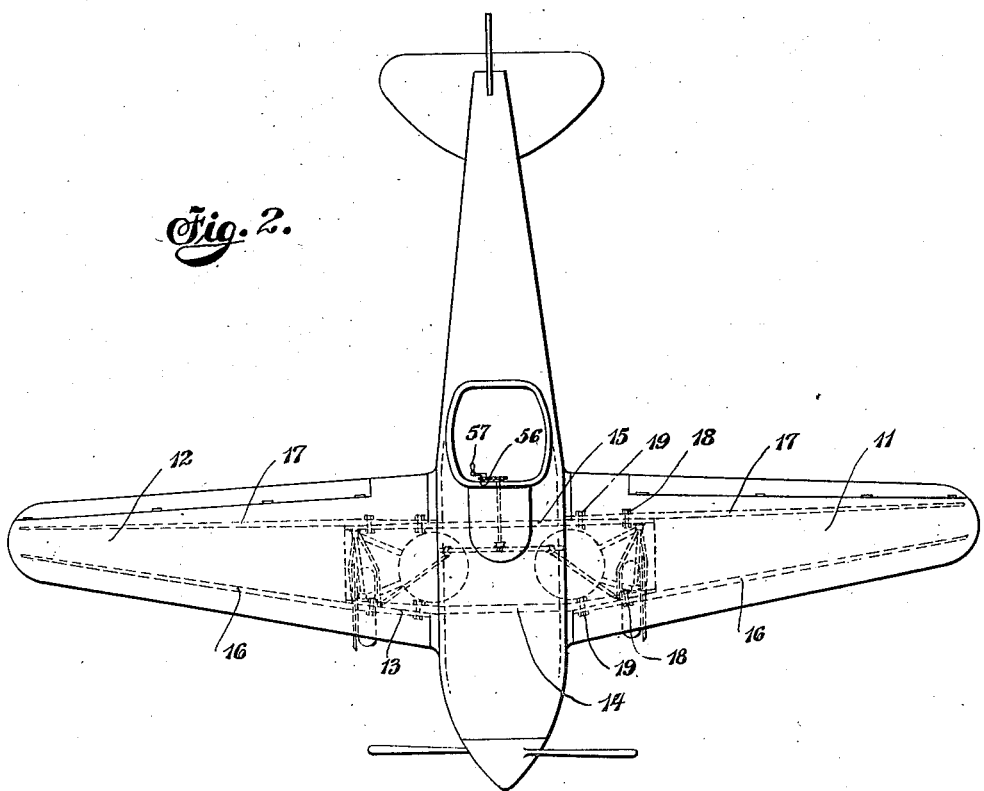

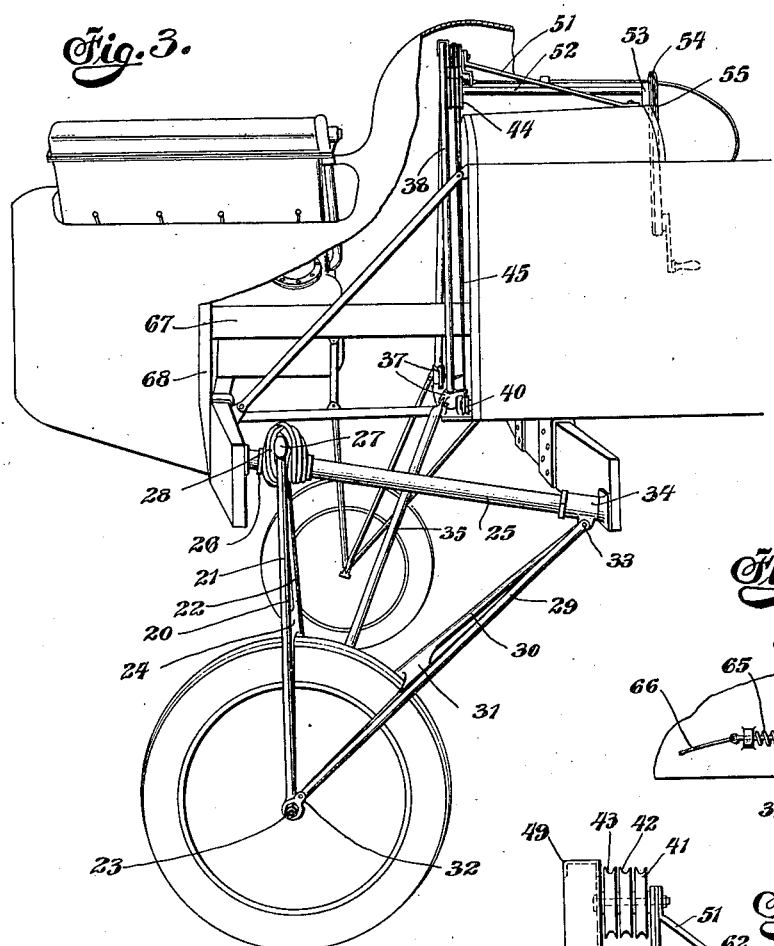

Patented July 23, 1929.

1,721,935

UNITED STATES PATENT OFFICE.

ARTHUR L. THURSTON AND HARRY T. BOOTH, OF HAMMONDSPORT, NEW YORK, ASSIGNORS, BY DIRECT AND MESNE ASSIGNMENTS, TO CHARLES H. KEEL, TRUSTEE, OF NEW YORK, N. Y.

AIRCRAFT.

Application filed June 13, 1923. Serial No. 645,012.

This invention relates to aeroplanes.

One object of the invention is an aeroplane of the heavier than air type embodying an improved landing gear and mounting enabling the landing gear to be retracted at will while the machine is in the air, if desired, and at the same time possessing features of construction and operation which contribute to the yielding and balanced support of the craft while alighting or running along the ground.

A further object of the invention is a combined fuselage and aerofoil construction which enables the craft to be quickly assembled and disassembled and which at the same time cooperates with the retractible landing gear to facilitate the retraction and lowering of the same and to give the craft as a whole the rigidity and balance required to safely withstand the shocks during alighting and land operations.

To these ends the craft of this application embodies generally a three part wing and fuselage construction. The inner section of the wing carries the fuselage and, passing beyond the sides thereof, carries a pair of separate and distinct landing gears at points beyond the sides of the fuselage thereby providing the desired tread for stable maneuvering of the craft on the ground. These landing gears are devised to assume operative positions forward of the center of gravity of the craft and each of them is mounted so that it may be swung inwardly up against the framework of the craft, the mounting preferably being such that the wheels have a backward and also a twisting component of movement in the retracting operation. The three part wings are of a construction to readily fit on to each other and to be firmly and securely attached with the forces properly distributed to provide the necessary factor of safety.

For a better understanding of the above indicated novel features of this invention and others which will hereinafter appear, reference may be had to the accompanying drawings forming a part of this specification wherein:

Fig. 1 is a front view of the craft as a whole;

Fig. 2 is a plan view of the same;

Fig. 3 is a side view of the forward part of the craft with certain parts omitted or broken away;

Fig. 6 is a diagrammatic view illustrating certain operative features of the retracting mechanism;

Fig. 7 is a detail of the locking means for the landing gear; and

Fig. 8 is a detail of the releasing mechanism.

Figure 4:
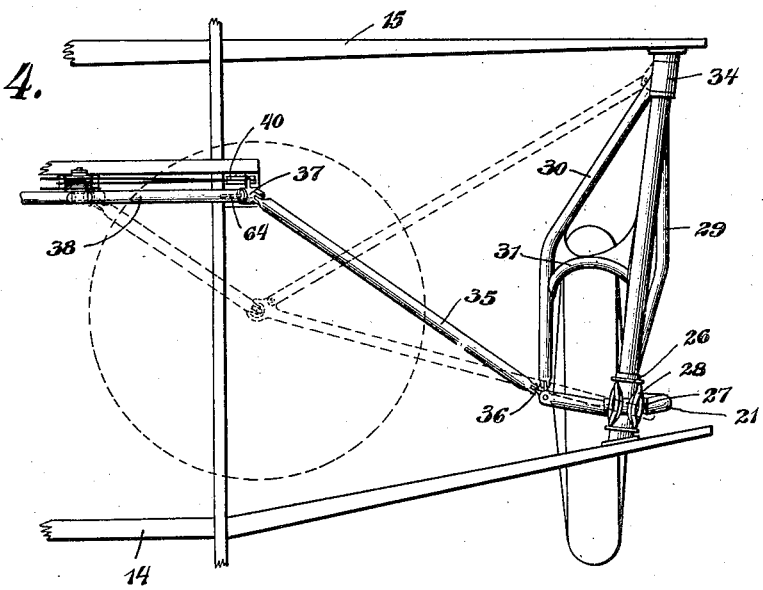
Fig. 4 is a plan view illustrating the landing gear and mounting.

Referring to the drawings where similar numerals designate similar parts throughout, an aeroplane of the monoplane type is illustrated embodying a supporting aerofoil or wing 1, a main body 2 or fuselage 2, and landing gears 3 and 4. The landing gears 3 and 4 are illustrated in their operative position, namely, at points forward of the vertical transverse plane passing through the center of gravity of the craft. These landing gears 3 and 4 are separately and individually mounted and are retractible out of operative position by inward swinging movements as indicated in dotted lines in Fig. 1 into the recesses 5 and 6 respectively, these recesses being formed underneath the fuselage and the inner part 13 of the three part wing construction (hereinafter referred to). Slots 7, 8, 9 and 10 are also provided in the bottom of the control wing section to accommodate the landing gear frame members when in the retracted position.

The wing 1 is illustrated as of a three part construction, the outer ends being designated by the numerals 11 and 12 and the central or stub wing part being indicated by the numeral 13. The stub wing 13 comprises a pair of stub beams 14 and 15 and the landing gears 3 and 4 are mounted on the outer ends of these stub beams, and, as above indicated, are adapted to swing inwardly and upwardly into suitable recesses 5 and 6 formed on the bottom of the fuselage and the stub wing section. The left and right hand sections 11 and 12 of the wing embody the wing beams 16 and 17 and the inner ends of these beams 16 and 17 are adapted to fit on to and straddle the outer ends of stub beams 14 and 15. These beams overlap a considerable distance, as indicated, and suitable attaching means such as the fittings 18 and 19 are provided for anchoring the wing sections 11 and 12 to the inner section 13. These means are diagrammatically illustrated as comprising bolts but it is understood that suitable fittings in addition to the bolts are provided for securely anchoring the members together. The landing gears being carried by the outer ends of the stub wings at points beyond the sides of the fuselage form a wide tread for the machine and being carried by the stub wing in the manner indicated permit the wing sections 11 and 12 to be assembled and disassembled with great facility by merely manipulating the connecting means 18 and 19.

The landing gears 3 and 4 are similarly constructed and mounted so that a description of one of these will suffice. Each landing gear comprises a substantially vertical thrust frame 20 having two frame members 21 and 22 which straddle the wheels with their lower ends attached to the wheel axle 23 and having an integral web construction 24 at a point just above the wheel for rendering the frame 20 a unitary rigid structure. The upper end of the frame member 20 straddles a shaft 25 carried between the outer ends of the stub wing beams 14 and 15. A sleeve 26 is rotatably mounted on the forward end of the shaft 25 and is embraced by the upper ends of the frame members 21 and 22 which extend thereabove. A cross piece or carrier 27 is rigidly carried by the upper ends of frame members 21 and 22 and suitable yielding or elastic means such as the cord 28 is laced around the sleeve 26 and this carrier 27 to provide for yielding movement of the wheels in the upward direction, the thrust being substantially in line with the frame member 20. Each landing gear also comprises a pair of rear frame members 29 and 30 which are rigidly fixed to each other by the strengthening web 31. These members straddle the wheel and have their lower ends pivoted to the wheel hub at the points 32 to provide for relative movement in vertical planes. These frame members 29 and 30 converge together at their upper ends and are pivoted at 33 to a sleeve 34 to accommodate movements of the landing gear structure relatively to the shaft 25 in vertical planes. The sleeve 34 like the sleeve 26 is rotatable upon the shaft 25 thereby providing for swinging movement of a wheel in directions transverse to the plane of the axis or shaft 25. The shaft or axis 25 is downwardly inclined in a rearward direction as indicated in Fig. 3 and diverges in the rearward direction from the plane of the wheel and the longitudinal axis of the machine as indicated in Figs. 2 and 4 for a purpose hereinafter described. Each landing gear also comprises a retracting member 35 which is connected to the wheel hub structure at its inner point by means of a universal connection 36 to provide for free relative angular movement of the landing gear in all directions. The upper end of the operating member 35 is attached and pivoted to a sliding sleeve 37 which is carried by an upright guide member 38. These members are rigidly mounted upon the fuselage framework and converge upwardly to an operating mechanism hereinafter described. The sleeves 37 are slidable up and down the members 38 and carry the operating members 35 with them to retract and lower the landing gears. In the embodiment illustrated there is shown a system of pulleys and continuous cables for effecting the operation of the landing gears. This is shown diagrammatically in Fig. 6 wherein a pair of guide pulleys 40 are carried by the fuselage framework at points adjacent the lower ends of the shafts 38 and three similar guide pulleys 41, 42 and 43 are carried at a point adjacent the upper ends of the shafts 38 just above a driving pulley 44 and a continuous cable 45 passes around these various pulleys as indicated in Fig. 6. The sliding sleeves 37 are attached to these cables at the points indicated so that by actuating the pulley 44 in one direction or the other the sliding sleeves 37 may be drawn upwardly or downwardly to retract or lower the landing gear at will. The pulleys 41, 42, 43 and 44 are mounted on any suitable framework as, for example, between the carrying plates 47 and 48, the plate 47 having a hooked upper end 49 extending over the upper ends of the uprights 38 to form the main carrying member, and the lower end thereof being bent inwardly for attachment to the plate 48. The latter is reinforced by a bracing member 51 at its upper end. The pulley 44 is fixed to and carried by an operating shaft 52 which passes through and is journaled in the supporting plates 47 and 48. It extends rearwardly to the cockpit and is journaled in a bearing support 53, and on its rearward end carries a sprocket wheel 54 at a point within or adjacent the cockpit of the machine. The sprocket wheel 54 is connected through the chain 55 with another sprocket 56 to which an operating hand crank 57 is attached for effecting the operation of the landing gear. The rearward face of the pulley 44 is provided with an annular row of ratchet teeth indicated generally at 59 and a pawl 60 carried by the member 61 pending downwardly from the upper end of the plate 48, passes through this plate 48 and normally engages these ratchet teeth to retain the landing gear in the retracted position. A spring 62 disposed between the lower angle end of member 61 and a collar on the pawl 60 normally urges this pawl against the pulley face. A hand cable 63 is attached to the outer end of the pawl to enable the operator to release the pulley 44 and permit the landing gear to be lowered into the operative position as, for example, by gravity or by actuation of the system of cables and pulleys. A latch 64 normally engages the sliding sleeve 37 when the landing gear is in the lowered or operating position to rigidly hold the same in that position and is urged by a spring 65 into a position to automatically lock the sleeves 37 when the same are lowered, the upper end of the latch 64 being rounded off to permit the sleeves 37 to go easily therepast. A cable 66 is provided which leads to a point convenient to the cockpit or the operator of the machine to permit him to withdraw the latch 64 against the spring 65 out of engagement with the upper edge of sleeve 37 when it is desired to lift the landing gear upwardly.

Figure 5:
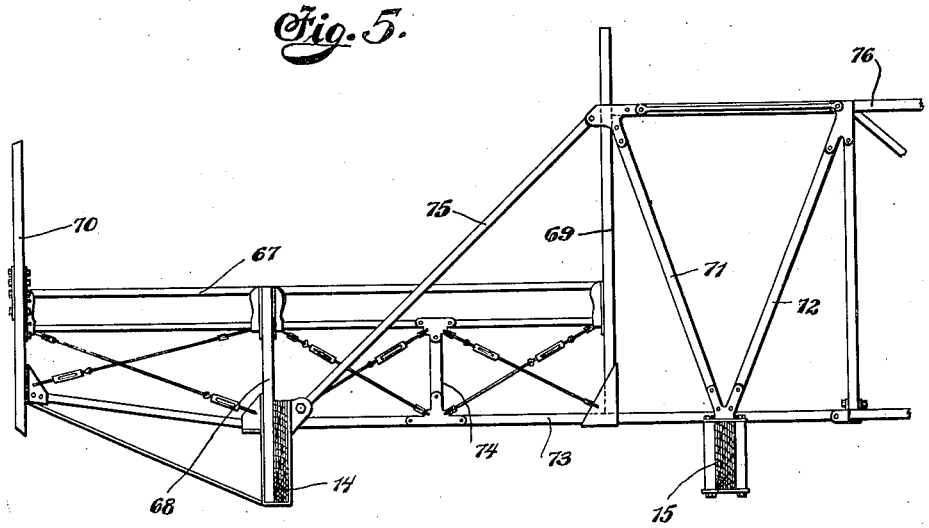
Fig. 5 is a side view showing the front fuselage construction.

Fig. 5 illustrates the fuselage and engine bed framework construction wherein it is noted that the front stub wing beam 14 extends under motor supporting bed members 67, this beam being securely attached by suitable fittings to the rear side of the vertical diaphragm member 68 which forms the main support for the motor bed. The motor bed members 67 are suitably attached at their rear ends to the vertical bulkhead 69 and at their forward ends to the nose plate 70. The beam 14 comprises a central straight portion and the two outer rearwardly bent portions but is integral throughout and may be formed of laminations as indicated. The beam 15 is carried underneath the fuselage frame structure as indicated in Fig. 5, two upwardly diverging braces 71 and 72 being attached to each of the bottom longerons 73 at points above the beam, and preferably by the beam fitting. Suitable braces 74 converge upwardly from the longerons 73 and are attached at their upper ends to motor bed members. A pair of diverging tie rods 75 extend upwardly from the beam 14 at the points where the longerons 73 are joined to the beam and have their upper ends attached to the ends of the upper longerons 76. The beams 16 and 17 are gradually tapered from a point adjacent the fittings 18 to their outer ends. Their inner ends are also slightly tapered in thickness to match the reversely tapered stub beams 14 and 15 throughout their overlapping portions.

The operation of the landing gear is as follows:

When it is desired to raise or retract the gear, the operator releases the latches 64 and operates the crank 57 until each of the landing gears with their structures are in their uppermost positions within the recesses 5 and 6 and the slots 7, 8, 9 and 10. The pawl 60 automatically holds the gear in the retracted position by engaging the ratchet teeth on the inner face of the pulley 44, these ratchet teeth permitting the pawl to slip over in the retracting operation. By having the shaft axes 25 diverging rearwardly from the plane of the wheel or from the longitudinal axis of the machine, the landing gear and wheel has a rearward component of movement when it is being swung upwardly as indicated in dotted lines in Figs. 2 and 4. This enables the wheel, notwithstanding the forward operative position thereof beyond the center of gravity, to be brought up between the stub beams of the stub wing 13 when in the retracted position. The downward inclination of these shafts or axes 25 results in a slight twist or levelling movement of the wheels whereby they come substantially flush with the under surface of the stub wing when in the elevated position notwithstanding the diverging of the shafts from the plane of the wheels. The landing gears are therefore not only flush with the under surface of the wing when retracted and entirely within the space defined by the stub beams, but in the operative position are well forward of the center of gravity to provide for stability in operation on the ground.

We claim:

1. In an aeroplane, the combination of a main body, supporting members extending laterally therefrom and a pair of landing gears carried by said supporting members on opposite sides of said main body and mounted for swinging movement transverse to the line of flight about axes for retracting movements toward the bottom of said body, said axes being so related to the craft as to cause a longitudinal movement of the landing gear while being shifted from one position to another.

2. In an aeroplane, the combination of a main body, a stub wing having members extending beyond the sides of the main body and a pair of landing gears mounted on said members, each gear mounted on a shaft for inward swinging movement, and each shaft being disposed in a plane inclined to the direction of travel.

3. In an aeroplane, the combination of a main body, a wing structure comprising a stub wing having wing beams extending beyond the main body, a pair of landing gear structures carried by the outer ends of said stub beams and mountings for said landing gears comprising a pair of shafts diverging rearwardly from directions parallel to the longitudinal axis of the machine and means providing for swinging movements of the gears about the shafts as axes whereby the said landing gears may be swung inwardly towards each other against the bottom of the craft with a rearward component of movement.

4. An aeroplane comprising a main body, a supporting wing or aerofoil structure comprising a stub wing having wing beams extending beyond the sides of the main body, a pair of landing gears carried by the outer ends of said stub beams and mountings therefor comprising a pair of shafts having a downward inclination in the rearward direction whereby correcting levelling movements are given to the landing gear structures in their upward movement.

5. In an aeroplane, the combination of a main body, a supporting wing structure comprising a central wing portion having wing beams extending past the sides of the main body and a pair of landing gears mounted on the outer ends of said stub beams, the mountings comprising a pair of shafts carried between the beams, said shafts extending rearwardly but diverging from the longitudinal direction and having a downward inclination whereby the landing gears may be swung inwardly towards each other and against the bottom of the craft with a component of movement in the rearward direction.

6. In an aeroplane, the combination of a main body, a supporting wing therefor and a pair of landing gears carried beneath the craft and adapted to be retracted to positions against the bottom of the craft, each of said landing gears comprising a rearwardly extending axis or shaft about which the wheel mounting is adapted to be swung, an upwardly inclined guide together with a sliding sleeve or carrier thereon for each of said landing gears, power connecting members connecting said sleeves to said landing gears, means for actuating said sleeves to cause them to slide up and down the guides and a spring control latch mechanism for locking said sleeves in their lowermost position.

7. In an aeroplane, the combination of a main body, a supporting wing carried thereby, a pair of landing gears disposed beneath the craft and including mountings whereby they may be swung inwardly towards each other up against the bottom of the craft and operating means for said landing gears comprising a pair of upwardly converging guide members with slidable sleeves thereon, power transmitting members connecting the slidable sleeves with the landing gears by means of universal connections and a system of pulleys and continuous cable connections arranged parallel to said guide members, the cable being attached to the sliding members, together with means for operating said pulleys.

8. A landing gear for aircraft comprising a wheel, a pair of diverging frame members extending upwardly, one of said members being substantially vertical and having a yielding connection between its upper end and the craft and the other of said members being inclined to the vertical and extending in the direction of the line of flight together with a bracing member having one end attached by means of universal connection to the landing gear and extending inwardly towards the center line of the craft and anchored thereto.

9. In an aeroplane, the combination of a main body, a pair of wing beams passing under the forward end of said body and a pair of landing gears mounted on the outer ends of said wing beams, each of said landing gears being mounted on a downwardly inclined and rearwardly diverging shaft carried between said beams, each of said landing gears having a substantially vertical thrust frame straddling the forward end of said shaft and having an elastic cord laced around the straddling upper end and the forward end of the shaft and a brace and power transmitting shaft extending inwardly from the landing gears and engaging sliding sleeves mounted on upwardly converging guide members together with means for carrying said sliding sleeves up and down the guides for lowering and retracting the gear.

10. In an aeroplane, the combination of a main body and supporting wings with a pair of retractable landing years carried by the craft on opposite sides of the main body, said gears being mounted for swinging movements transversely to the line of flight about axes inclined to the direction of flight so as to cause a fore and aft movement of the landing gear while being shifted from one position to another.

In testimony whereof, we have signed our names to this specification.

ARTHUR L. THURSTON.
HARRY T. BOOTH.